(12) United States Patent
Takahashi et al.

(10) Patent No.: US 8,113,769 B2
(45) Date of Patent: *Feb. 14, 2012

(54) EXPANSION TURBINE HAVING A VARIABLE NOZZLE MECHANISM

(75) Inventors: Toshio Takahashi, Tokyo (JP); Seiichiro Yoshinaga, Tokyo (JP); Hirohisa Wakisaka, Chigasaki (JP)

(73) Assignee: IHI Corporation (JP)

( * ) Notice: Subject to any disclaimer, the term of this patent is extended or adjusted under 35 U.S.C. 154(b) by 958 days.

This patent is subject to a terminal disclaimer.

(21) Appl. No.: 12/058,901

(22) Filed: Mar. 31, 2008

(65) Prior Publication Data

US 2008/0240908 A1 Oct. 2, 2008

(30) Foreign Application Priority Data

Mar. 29, 2007 (JP) ................................ P2007-089478

(51) Int. Cl.
*F01D 17/12* (2006.01)
(52) U.S. Cl. .................... 415/150; 415/156; 415/160
(58) Field of Classification Search .......... 415/134–139, 415/150, 160, 163–165, 191, 156
See application file for complete search history.

(56) References Cited

U.S. PATENT DOCUMENTS

| 3,657,898 | A | | 4/1972 | Ness et al. .................... 62/87 |
| 4,502,836 | A | | 3/1985 | Swearingen ................ 415/150 |
| 4,679,984 | A | * | 7/1987 | Swihart et al. .............. 415/163 |
| 6,382,910 | B1 | * | 5/2002 | Kato et al. ................... 415/150 |
| 7,407,367 | B2 | * | 8/2008 | McAuliffe et al. ........... 415/150 |
| 7,478,991 | B2 | * | 1/2009 | Noelle .......................... 415/159 |
| 2006/0034684 | A1 | | 2/2006 | Metz et al. .................... 415/191 |

FOREIGN PATENT DOCUMENTS

| FR | 2767862 | 3/1999 |
| JP | 7-83001 | 3/1995 |
| JP | 2001-132410 | 5/2001 |
| JP | 2001-152808 | 6/2001 |
| WO | WO 85/04692 | 10/1985 |

OTHER PUBLICATIONS

European Search Report dated Sep. 16, 2010 issued in corresponding European Application No. 08251243.5.
Transmittal letter from European Patent Office dated Jan. 9, 2009, forwarding European Search Report in EP 08251146, and forwarding letter from Marks & Clerk to Shiga International Patent Office date-stamped received Feb. 2, 2009 (10 pages total).

(Continued)

*Primary Examiner* — Edward Look
*Assistant Examiner* — Andrew C. Knopp
(74) *Attorney, Agent, or Firm* — Ostrolenk Faber LLP

(57) ABSTRACT

Expansion turbine having a variable nozzle mechanism comprises an adiabatic expansion device located in a vacuum container having a turbine impeller therein which rotates and drives the turbine impeller during adiabatic expansion of very low temperature gas, and varies the throat area of very low temperature gas introduced in the turbine impeller by driving a nozzle member disposed near the outside end of the adiabatic expansion device by a drive force from a driving member located outside the vacuum container; a plate member provided detachably in contact with the outside end of the body of the adiabatic expansion device, wherein the support side of the nozzle member is connected to and supported by the plate member, and the drive side of the nozzle member is connected to and supported by the driving member.

5 Claims, 5 Drawing Sheets

OTHER PUBLICATIONS

Office Action dated Sep. 20, 2011 issued in corresponding Japanese Patent Application No. 2007-089477 with English translation (6 pages).

Office Action dated Sep. 20, 2011 issued in corresponding Japanese Patent Application No. 2007-089478 with English translation (4 pages).

* cited by examiner

EXPANSION TURBINE HAVING A VARIABLE NOZZLE MECHANISM

BACKGROUND OF THE INVENTION

1. Field of the Invention

The present invention relates to expansion turbine having a variable nozzle mechanism used in large refrigerators such as helium refrigerator. Priority is claimed on Japanese Patent Application No. 2007-089478, filed Mar. 29, 2007, the content of which is incorporated herein by reference.

2. Description of Related Art

Expansion turbines have been used conventionally to enhance the efficiency of refrigerators. To regulate the flow rate of gas introduced into such an expansion turbine, as shown in FIG. 5, expansion turbines using variable nozzle mechanism 10 are popularly used (for example, refer to the Japanese Unexamined Patent Application, First Publication No. 2001-132410.)

This variable nozzle mechanism 10 comprises a nozzle member 14 used to change the throat area of very low temperature gas introduced into a turbine impeller 12, and a driving member 16 used to drive the nozzle member 14. The nozzle member 14 is built into an adiabatic expansion device 20 located in a vacuum container 18. The driving member 16 is disposed outside the vacuum container 18 so as to not expose it to low temperatures and thereby ensure mechanical reliability.

As shown in FIG. 5, the nozzle member 14 and the driving member 16 are connected to each other by a thin cylindrical member 22 coaxial with a turbine impeller 12.

The nozzle member 14 is driven by the oscillation of the cylindrical member 22 around the axial center C of the turbine impeller 12. The nozzle member 14 is disposed to surround the turbine impeller 12. It includes a plurality of movable nozzle plates 14a each oscillatably supported by a support pin 24, and a drive disc 28 connected to the inside end of a cylindrical member 22 and to each of the movable nozzle plate 14a by a drive pin 26. These are pressed against the adiabatic expansion device 20 after receiving a biasing force in the direction of the axial center C by a retaining spring 30.

Moreover, the driving member 16 comprises a rotating drive device 36 such as a pulse motor for driving an oscillatable gear 32 through a gear 34 with the center as the axial center C of the turbine impeller 12 connected to the outside end of the cylindrical member 22.

This variable nozzle mechanism 10 oscillates the cylindrical member 22 about the axial center C of the turbine impeller 12 by driving the rotating drive device 36, oscillates the drive disc 28, and oscillatably drives the movable nozzle plate 14a about the support pin 24 taken as the center, and changes the angle of the movable nozzle plate 14a. In this manner, by continuously changing the throat area of the variable nozzle, the flow rate of gas passing through is regulated.

In expansion turbines using such a conventional variable nozzle mechanism 10, the driving member 16, the cylindrical member 22, the gear 32 and the drive unit 40 including the rotor shaft 38 are configured to be removed as an integral body from the adiabatic expansion device 20 in the vacuum container 18.

However, in the variable nozzle mechanism 10 of the conventional expansion turbine mentioned above, when the drive unit 40 is removed from the adiabatic expansion device 20 in the vacuum container 18 during maintenance, the turbine impeller 12 and the nozzle member 14 tend to be left behind in the vacuum container 18 on the low temperature side. For this reason, when the nozzle member 14 is removed for inspection of coating condition of nozzle or replacement of parts, it becomes necessary to break the vacuum within the vacuum container 18 once, and then remove the nozzle member 14 from the low temperature piping, thus necessitating disassembly work on the low temperature piping side of the vacuum container 18.

In this way, it was very troublesome and required much efforts to remove the nozzle member 14 from the variable nozzle mechanism 10 of the conventional expansion turbine; thus, maintenance work such as replacement and inspect ion of the nozzle member 14 was not easy. Particularly, when degradation or wear exists in the nozzle member 14, for instance, when the flow passage surface of the nozzle peels out or wears out, leak of gas passing through the throat is induced, which has an adverse effect on the performance of the expansion turbine.

For this reason, the development of a variable nozzle mechanism for which maintenance can be carried out easily and which has no adverse effect on the original performance of the expansion turbine, was demanded.

After considering the circumstances mentioned above, the present invention has the object of offering an expansion turbine having a variable nozzle mechanism that enables the nozzle member to be removed easily together with the drive unit, permits maintenance to be performed easily, and moreover has no adverse effect on the original performance of the expansion turbine.

SUMMARY OF THE INVENTION

The present invention makes use of the structure below for resolving the aforementioned issues in the expansion turbine having a variable nozzle mechanism.

The present invention is an expansion turbine with a variable nozzle mechanism comprising: an adiabatic expansion device located in a vacuum container having a turbine impeller therein which rotates and drives the turbine impeller during adiabatic expansion of very low temperature gas, and varies the throat area of very low temperature gas introduced in the turbine impeller by driving a nozzle member disposed near the outside end of the adiabatic expansion device by a drive force from a driving member located outside the vacuum container; and a plate member provided detachably in contact with the outside end of the body of the adiabatic expansion device, wherein the support side of the nozzle member is connected to and supported by the plate member, and the drive side of the nozzle member is connected to and supported by the driving member.

According to the present invention, the support side of the nozzle member is connected to and supported by the plate member, and the drive side of the nozzle member is connected to and supported by the driving member. The plate member is provided detachably in contact with the outside end of the body of the adiabatic expansion device located inside the vacuum container. As a result, the driving member, the nozzle member and the plate member are connected to each other in the axial direction.

The plate member and the driving member may be disposed in the axial direction of the turbine impeller such that they are in close contact with the trailing faces of the nozzle member in the expansion turbine having a variable nozzle mechanism mentioned above.

According to the present invention, very low temperature gas is introduced into the turbine impeller without flowing through these clearances because plate member and the driving member are in close contact with the trailing faces of the nozzle member in the axial direction of the turbine impeller.

In the expansion turbine having a variable nozzle mechanism, the nozzle member may be disposed to surround the turbine impeller and may be composed of a plurality of movable nozzle plates each of which is oscillatably connected to and supported by the plate member through a support pin, and each movable nozzle plate may be connected to and supported by the driving member through a drive pin.

According to the present invention, a plurality of movable nozzle plates is each connected to and supported by a plate member through a support pin, and the driving member is connected to and supported by each movable nozzle plate through the drive pin. As a result, the driving member, a plurality of movable nozzle plates and the plate member are connected to each other in the axial direction.

In the expansion turbine having a variable nozzle mechanism mentioned above, a first internally threaded hole may be provided on the support side of the movable nozzle plate looking toward a direction coaxial with the turbine impeller, an externally threaded part formed at one end of the support pin may be fitted into the first internally threaded hole, and the other end of the support pin may be connected to be circularly movable in the recess hole provided so as to face the first internally threaded hole in the plate member, a longitudinal hole may be provided looking toward a direction coaxial with the turbine impeller on the drive side of the movable nozzle plate, a second internally threaded hole may be provided facing the longitudinal hole in the driving member, the externally threaded part formed in one end of the drive pin may be fitted into the second internally threaded hole, and the other end of the drive pin may be guidably connected to the longitudinal hole.

According to the present invention, the support side of each movable nozzle plate is screwed and connected to the plate member and the drive side of each movable nozzle plate is screwed and connected to the driving member. Moreover, the other end of each drive pin is guidably connected to the longitudinal hole of each movable nozzle plate. As a result, the driving member, a plurality of movable nozzle plates, and the plate member is firmly connected in the axial direction, and each movable nozzle plate can vary the angle of disposition by driving the driving member.

In the expansion turbine having a variable nozzle mechanism mentioned above, the outside end of the driving member may be connected to the inside end of the cylindrical member disposed coaxially with the turbine impeller, and the driving member may be driven by the oscillation of the cylindrical member about the axial center of the turbine impeller.

According to the present invention, the cylindrical member, the driving member, the movable nozzle plate, and the plate member are connected in the axial direction, and the transfer of heat from the thin cylindrical member to the adiabatic expansion device reduces.

Also, according to the present invention, the nozzle member of the variable nozzle mechanism of the expansion turbine is integrated with the drive unit, and can therefore be removed easily. Moreover, disassembly of the vacuum container is not necessary when removing the nozzle member.

As a result, the maintenance of the expansion turbine is simplified, and the efficiency of maintenance and inspection work can be enhanced.

DETAILED DESCRIPTION OF THE INVENTION

Figure 1:
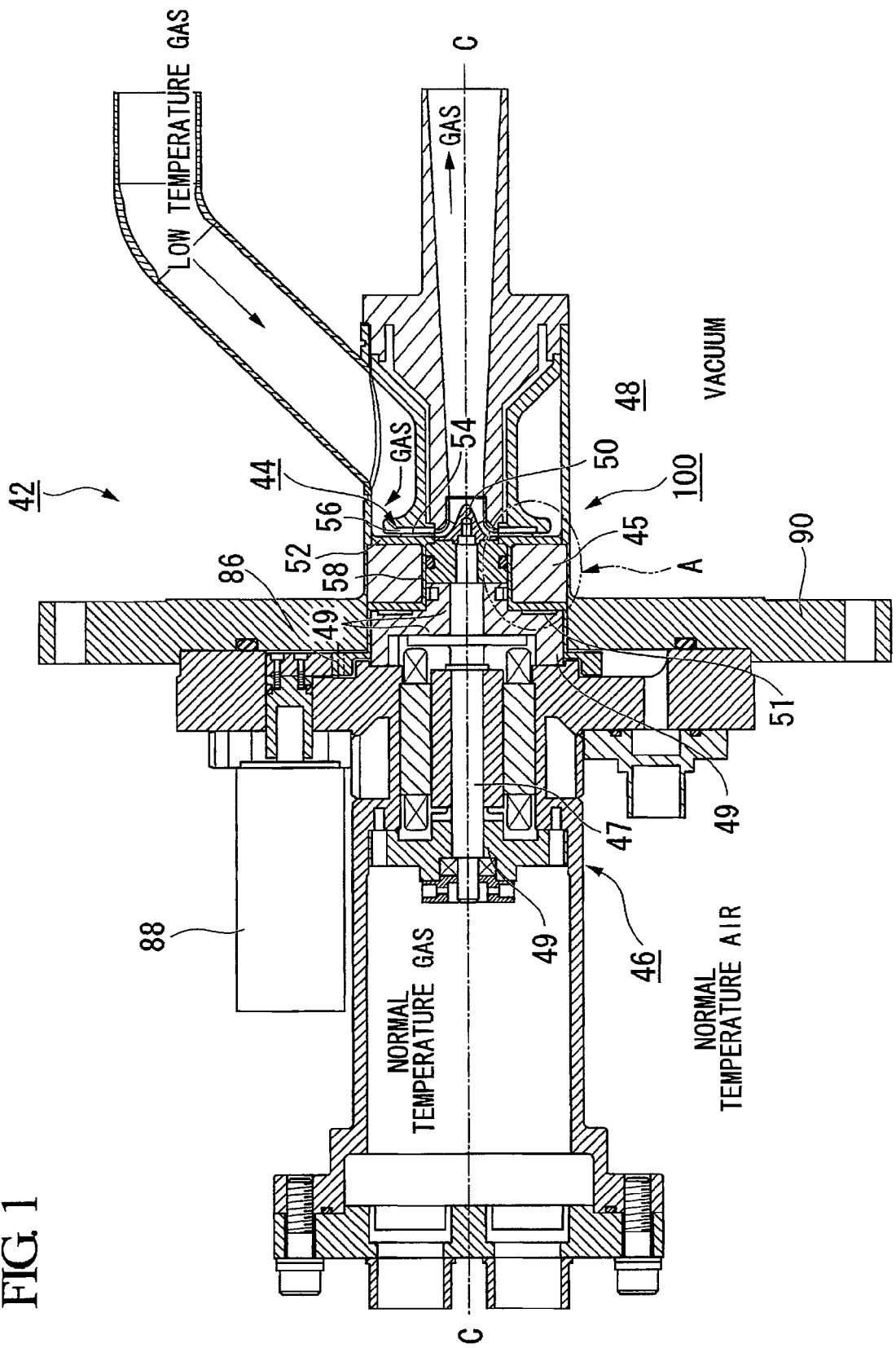
FIG. 1 is the overall configuration diagram showing an example of an expansion turbine having a variable nozzle mechanism related to the present invention.

The embodiments of the expansion turbine having a variable nozzle mechanism related to the present invention are described here referring to the drawings.

Figure 2:
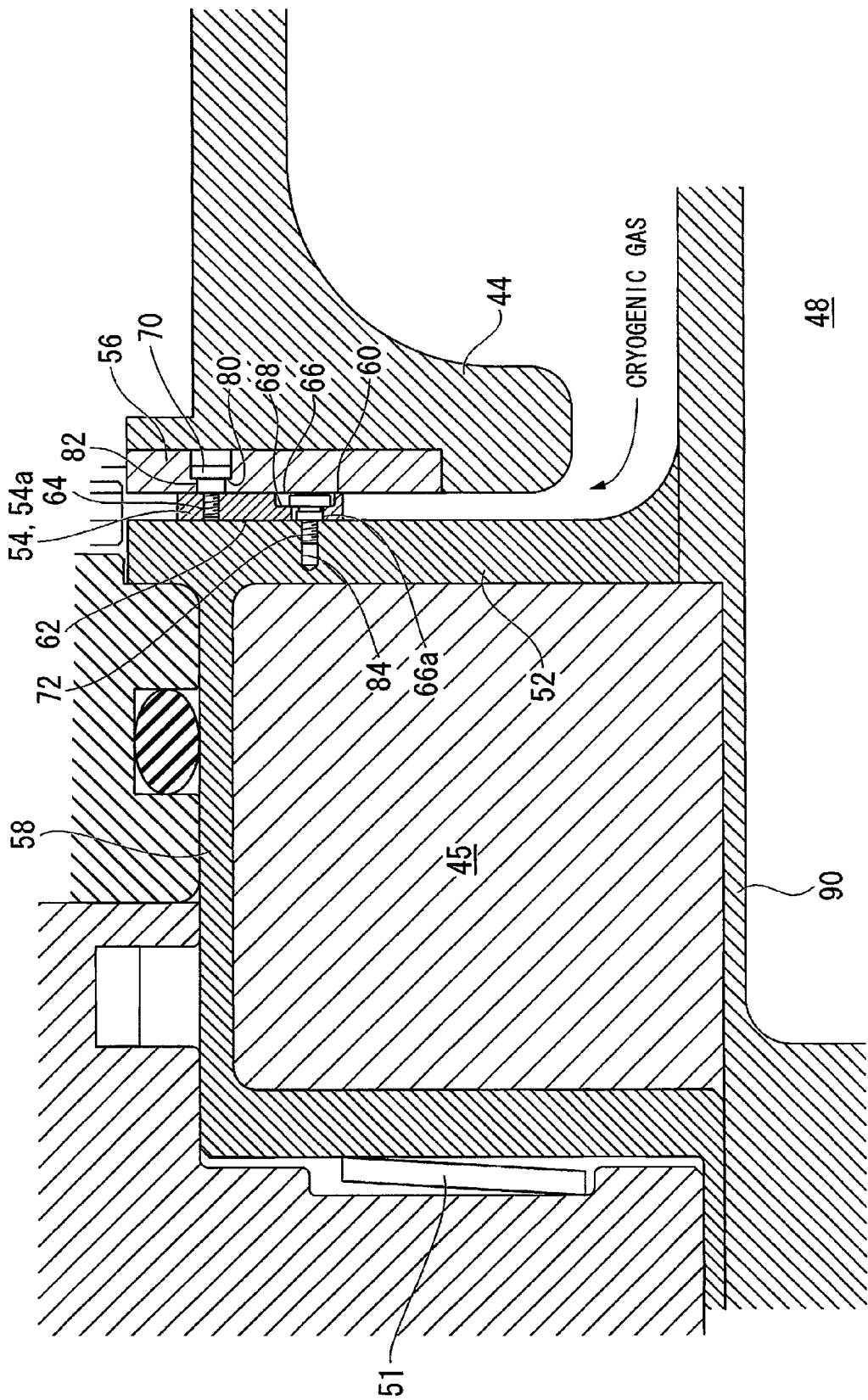
FIG. 2 is an expanded view of part A of FIG. 1.
Figure 3A:
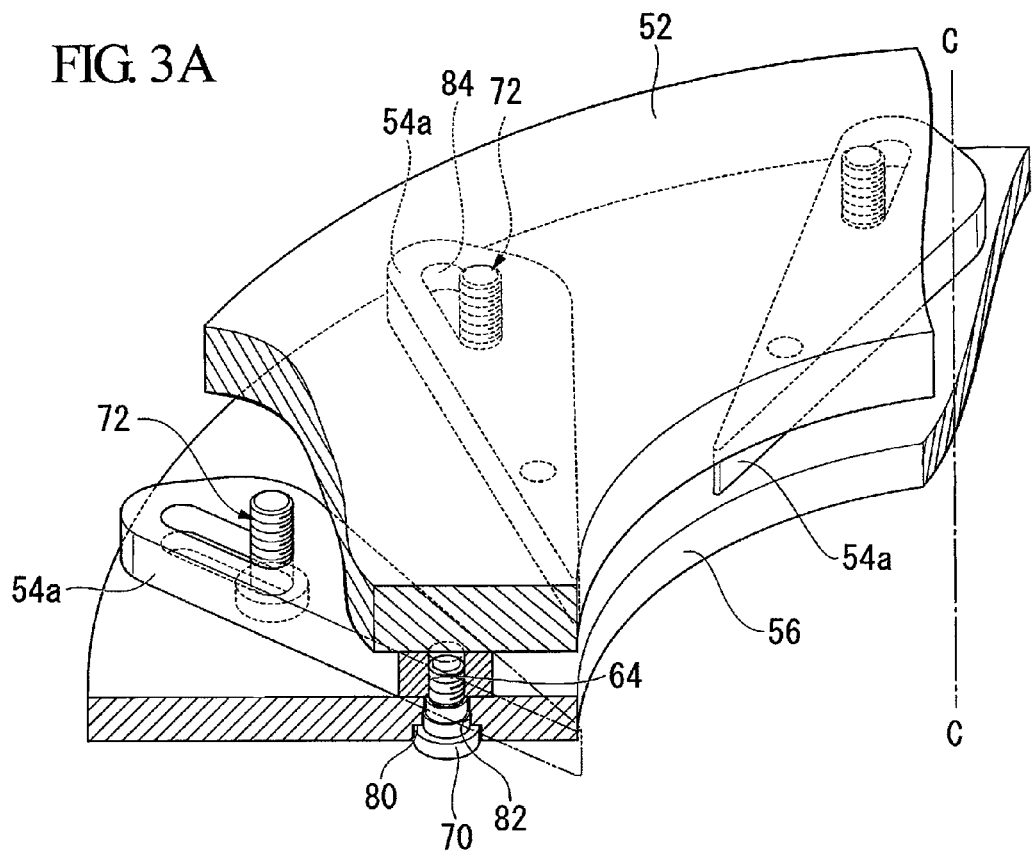
FIG. 3A to FIG. 3C are perspective views showing an example of construction of the variable nozzle unit of the variable nozzle mechanism of the expansion turbine related to the present invention.
Figure 3B:
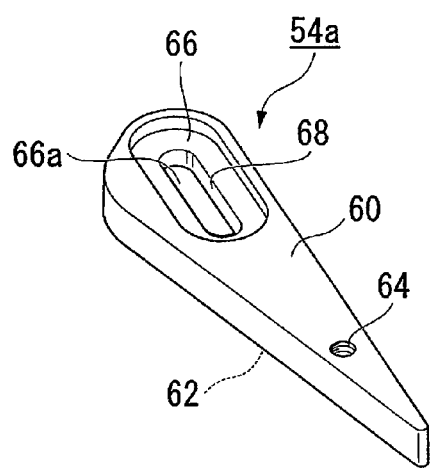
Figure 4:
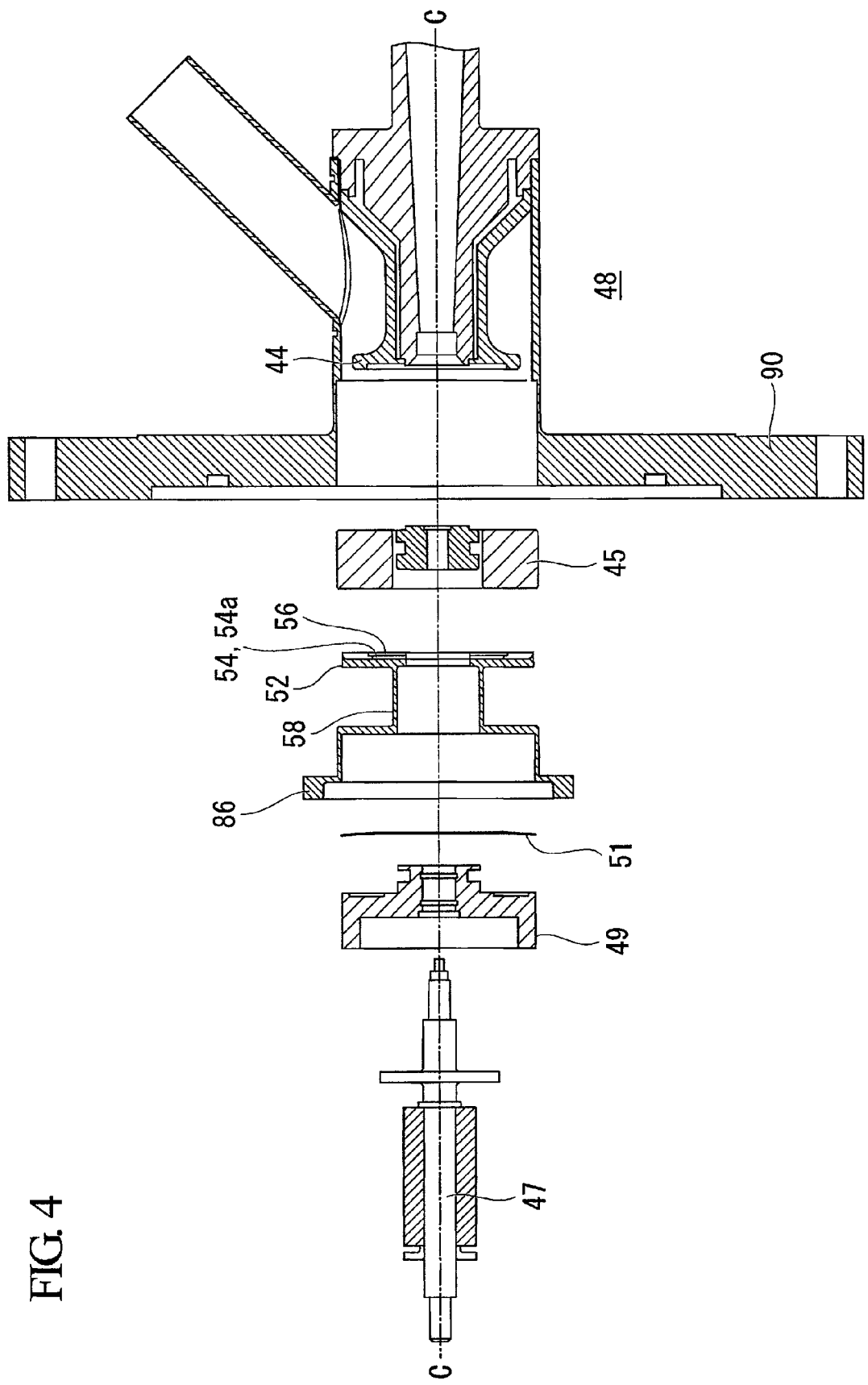
FIG. 4 is a partial exploded view of the drive unit side.
Figure 5:
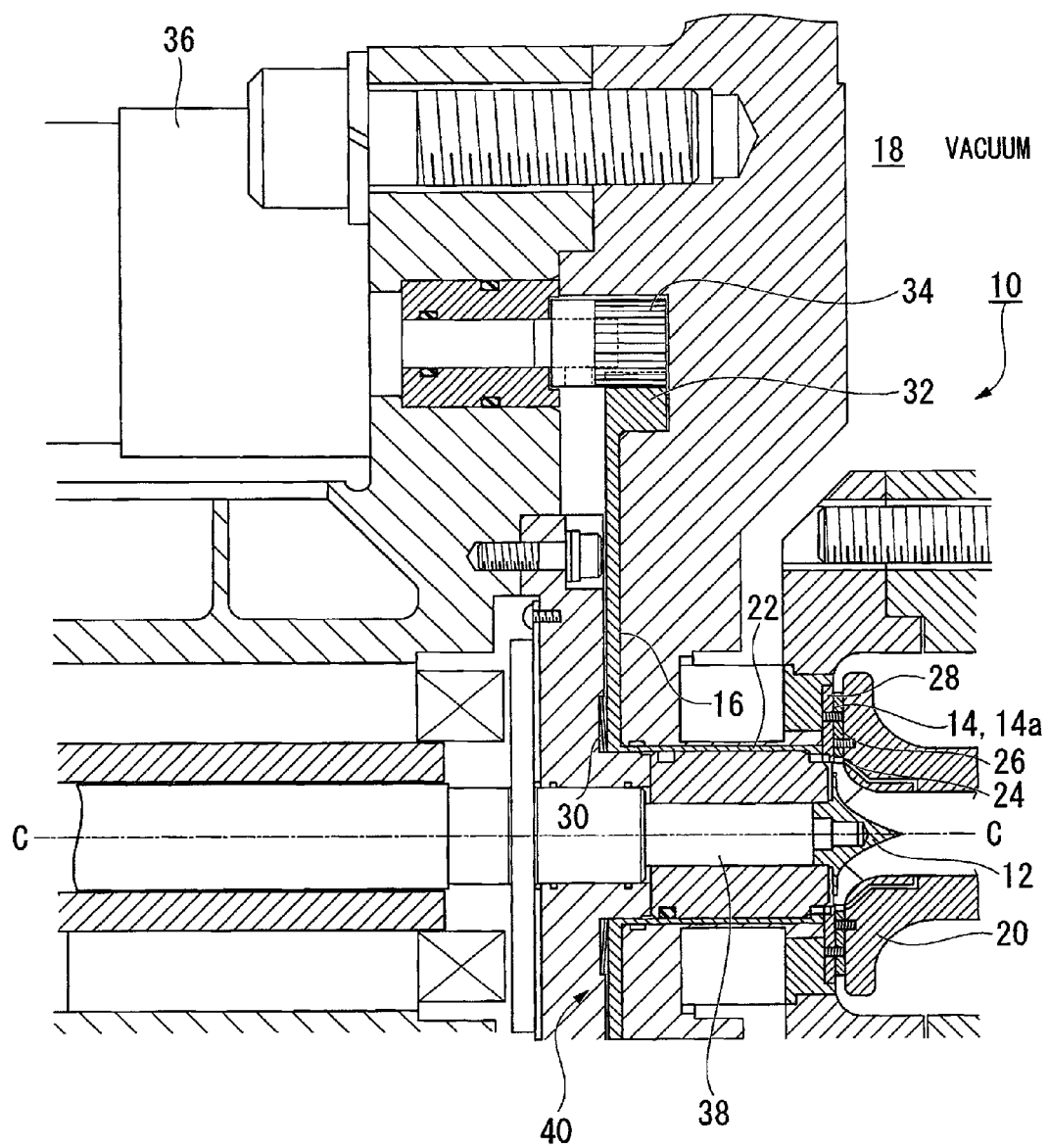
FIG. 5 is an overall configuration diagram showing an example of a variable nozzle mechanism of a conventional expansion turbine.

FIG. 1 is the overall configuration view showing an example of expansion turbine having a variable nozzle mechanism 42 related to the present embodiment. FIG. 2 is an expanded view of part A of FIG. 1. FIG. 3A to FIG. 3B are perspective views showing an example of construction of variable nozzle unit. FIG. 4 is a partial exploded view of the drive unit side.

As shown in FIG. 1, the expansion turbine 42 comprises an adiabatic expansion device 44, insulating material 45, a rotor shaft 47, a bearing 49, a retaining spring 51, a braking device 46, and a variable nozzle mechanism 100, and also a casing 90 to accommodate all these items.

The adiabatic expansion device 44 is located in the low temperature side region within a vacuum container 48 and includes a built-in turbine impeller 50. It rotates and drives a turbine impeller 50 when it adiabatically expands very low temperature gas (such as gas with a temperature of 4 K to 64 K).

This insulating material 45 is provided in the boundary portion on the low temperature side, suppresses the heat input from the room temperature side, and it may be made of glass FRP and the like.

The rotor shaft 47 is rotatably supported by bearing 49, and transmits the rotation of the turbine impeller 50 to the braking device 46 on the room temperature side.

The braking device 46 is located on the room temperature side region outside the vacuum container 48. A motor generator (not shown) connected coaxially with the center as the axial center C of the turbine impeller 50 may be used for example, as the braking device 46.

Also, by energizing the retaining spring 51 so that it presses the driving member 52 and the nozzle member 54 mentioned later, toward the adiabatic expansion device 44, gas leak from the clearance between the driving member 52, nozzle member 54 and the adiabatic expansion device 44 is prevented, and as a result, the degradation in efficiency of the expansion turbine is prevented.

As shown in FIG. 1 and FIG. 2, the variable nozzle mechanism 100 comprises a driving member 52 located on the room temperature side region outside the vacuum container 48, a nozzle member 54 disposed near the outside end of the body of the adiabatic expansion device 44 disposed on the inside end side of the driving member 52, and a plate member 56 located coaxially with the center as the axial center C so as to touch the outside end of the body of the adiabatic expansion device 44.

The plate member 56 and the driving member 52 are disposed to touch the trailing faces 60, 62 of the nozzle member 54, and separate in the direction of the axial center C facing each other. The support side of the nozzle member 54 is connected to and supported by the plate member 56, and the drive side of the nozzle member 54 is connected to and supported by the driving member 52.

The outside end of the driving member 52 is connected to the inside end of the thin cylindrical member 58 coaxial to the axial center C, and the driving member 52 is rotated circularly and driven by the oscillation of the cylindrical member 58 with the center as the axial center C.

A large gear 86 is also connected to the outside end of the cylindrical member 58. This large gear 86 rotates circularly receiving the drive force from the drive shaft of the rotating drive device 88, and oscillates the cylindrical member 58.

When the driving member 52 is driven by the oscillation of the cylindrical member 58, the nozzle member 54 drives and changes the throat area of the very low temperature gas introduced in the turbine impeller 50. As a result, the flow rate of gas passing through the turbine impeller 50 can be regulated. The thin cylindrical member 58 can be made as thin as required for the drive of the nozzle member 54 (for example, a thickness of about 0.5 mm).

If made thin in this way, the amount of heat transferred to the low temperature side from the cylindrical member 58 disposed on the room temperature side can be suppressed to a minimal level.

As shown in FIG. 2 and FIG. 3A, the nozzle member 54 comprises a plurality of movable nozzle plates 54a disposed at a distance from each other on the circumference with the axial center C as the center, surrounding the turbine impeller (not shown).

As shown in FIG. 3B, each movable nozzle plate 54a is offered as a cross-section of substantial teardrop shape, with its inside end face 60 touching the outside end face of the plate member 56. The outside end face 62 of the movable nozzle plate 54a is disposed to touch the inside end face of the driving member 52, and moreover, disposed such that the top side of the substantial teardrop shape faces the inward radial direction of circle about the axial center C, and the circular arc side faces the outward radial direction.

A first internal threaded hole 64 is formed facing the axial center C in the topside part of the support side face 60 of the movable nozzle plate 54a, and a longitudinal hole 66 is formed in the longitudinal direction of the substantial teardrop shape in the circular arc side part. This longitudinal hole 66 is formed so as to penetrate the inside end face 60 and the outside end face 62 in the direction of the axial center C. The two ends in the longitudinal direction are semi-circles with substantially rectangular shape; however by forming a step 68 inside the movable nozzle plate 54a, the cross section cut along the axial center C becomes a protruded shape as shown in FIG. 2, and the area of the longitudinal hole 66a of the outside end face 62 is formed to be smaller than the area of the longitudinal hole 66 of the inside end face 60.

Figure 3C:
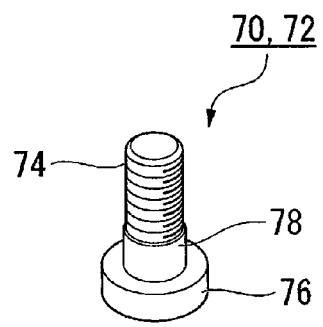

As shown in FIG. 3C, an externally threaded part 74 is formed in the front ends of the support pin 70 and the drive pin 72; at other ends, a large diameter head 76 larger than the diameter at the front end is formed. Furthermore, a externally threaded part 74 and a sliding part 78 of substantially the same diameter are formed between the head 76 and the externally threaded part 74.

The externally threaded part 74 of the front end of the support pin 70 is screwed together with each first internal threaded hole 64 of the movable nozzle plate 54a.

The head 76 of the support pin 70 and the sliding part 78 are provided such that the first internal threaded hole 64 is opposite to the plate member 56, and the side closer to the movable nozzle plate 54a is fitted into the recess hole 82 with narrowly formed step 80, so that the movable nozzle plate 54a and the plate member 56 are connected to be circularly movable, and these are supported in the direction of the axial center C.

The externally threaded part 74 of the front end of the drive pin 72 is designed to fit into a second internally threaded hole 84 provided at a position facing the longitudinal hole 66a in the driving member 52. The head 76 and the sliding part 78 of the drive pin 72 are fitted loosely in longitudinal holes such that the head 76 can smoothly slide within the longitudinal hole 66 on the support side of the movable nozzle plate 54a and the sliding part 78 can smoothly slide within the longitudinal hole 66a on the drive side. As a result, the drive pin 72 is slidably connected to the movable nozzle plate 54a along the longitudinal hole 66, and at the same time, the driving member 52 and the movable nozzle plate 54a are supported in the direction of the axial center C.

When the driving member 52 is driven in circular motion by the oscillation of the cylindrical member 58, each movable nozzle plate 54a swings each of its support pins 70 connected to the plate member 56 to the center, and at the same time, the drive pin 72 and the head 76 and the sliding part 78 are guidably slid into the longitudinal hole 66 of the movable nozzle plate 54a so that the angle of disposition of the movable nozzle plate 54a is changed, and the throat area of the very low temperature gas introduced in the turbine impeller 50 is continuously varied.

Next, the method of maintenance of the expansion turbine 42 with variable nozzle mechanism 100 mentioned above is described here.

The externally threaded part 74 of the support pin 70 is screwed and connected to the first internal threaded hole 64 of the movable nozzle plate 54a. The head 76 gets caught in the direction of the axial center C by the step 80 in the recess hole 82; as a result, the support pin 70 is connected in the direction of the axial center C to the plate member 56 and the movable nozzle plate 54a. On the other hand, the externally threaded part 74 of the drive pin 72 is screwed and connected to the second internally threaded hole 84 of the driving member 52. The head 76 gets caught in the direction of the axial center C by the step 68 in the longitudinal hole 66; as a result, the drive pin 72 is connected in the direction of the axial center C to the driving member 52 and the movable nozzle plate 54a, and thus can slide in the longitudinal direction within the longitudinal hole 66.

For this reason, the driving member 52, the plurality of movable nozzle plates 54a, and the plate member 56 are connected firmly in the axial direction, and each movable nozzle plate 54a can vary the angle of disposition by driving the driving member 52.

In the variable nozzle mechanism 100 related to the present embodiment, the driving member 52, the movable nozzle plate 54a, and the plate member 56 are integrated as a single unit in the axial direction, so for the maintenance of the movable nozzle plate 54a, as shown in FIG. 4, the driving member 52, the movable nozzle plate 54a, and the plate member 56 can be removed as a single unit by pulling out the driving member 52 from the vacuum container 48 as was done conventionally.

Moreover, after removal as a single unit, if the head 76 of the support pin 70 is rotated and pulled out from the plate member 56, the plate member 56 can be removed from the movable nozzle plate 54a. Furthermore, by rotating the head 76 of the drive pin 72 and pulling it out, the movable nozzle plate 54a can be removed from the driving member 52. As a result, maintenance and replacement of the movable nozzle plate 54a can be performed.

Accordingly, the nozzle member 54, which was often left behind in the adiabatic expansion device 44, when the driving member 52 was pulled out during maintenance of the variable nozzle mechanism 100 related to the present embodiment, can be easily removed together with the driving member 52; thus, maintenance such as inspection and replacement of nozzle parts can be performed more easily than before.

In the embodiment mentioned above, stainless steel M1 screws formed with a cross hole in the head 76 may be used for the support pin 70 and the drive pin 72. In this case, the dimensions of various parts of the screw may be for example, as follows: diameter of sliding part 78 may be 1.2 mm; diameter of the head 76 may be 1.8 mm, and thickness of the head 76 may be 0.5 mm.

Also, liquid adhesive may be filled in the very small clearance at the interface of the internally threaded holes 64, 84 and the externally threaded part 74.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An expansion turbine with a variable nozzle mechanism comprising:
   an adiabatic expansion device located in a vacuum container having a turbine impeller therein, the adiabatic expansion device rotates and drives the turbine impeller during adiabatic expansion of very low temperature gas, and varies a throat area of very low temperature gas introduced in the turbine impeller by driving a nozzle member disposed near the outside end of the adiabatic expansion device by a drive force from a driving member located outside the vacuum container;
   a plate member provided detachably in contact with the outside end of the body of the adiabatic expansion device and
   a pressing member which presses the driving member, the nozzle member and the plate member against the body of the adiabatic expansion device,
   wherein the driving member, the nozzle member, the plate member and the body of the adiabatic expansion device are sequentially disposed in the axial direction of the turbine impeller,
   the support side of the nozzle member is connected to and supported by the plate member, and
   the drive side of the nozzle member is connected to and supported by the driving member.

2. The expansion turbine having a variable nozzle mechanism according to claim 1, wherein the plate member and the driving member are each disposed in close contact with trailing faces of the nozzle member in the axial direction of the turbine impeller.

3. The expansion turbine having a variable nozzle mechanism according to claim 1, wherein the nozzle member is disposed to surround the turbine impeller and is composed of a plurality of movable nozzle plates each of which is oscillatably connected to and supported by the plate member through a support pin,
   wherein each movable nozzle plate is connected to and supported by the driving member through a drive pin.

4. The expansion turbine having a variable nozzle mechanism according to claim 3, wherein a first internally threaded hole is provided on the support side of the movable nozzle plate looking toward the direction coaxial with the turbine impeller, an externally threaded part formed at one end of the support pin is fitted into the first internally threaded hole, and the other end of the support pin is connected to be circularly movable in the recess hole provided so as face the first internally threaded hole in the plate member,
   a longitudinal hole is provided looking toward the direction coaxial with the turbine impeller on the drive side of the movable nozzle plate, and
   a second internally threaded hole is provided facing the longitudinal hole in the driving member, and
   the externally threaded part formed in one end of the drive pin is fitted into the second internally threaded hole, and the other end of the drive pin is guidably connected to the longitudinal hole.

5. The expansion turbine having a variable nozzle mechanism according to claim 1, wherein the outside end of the driving member is connected to the inside end of a cylindrical member disposed coaxially with the turbine impeller, and
   the driving member is driven by oscillation of the cylindrical member about the axial center of the turbine impeller.

* * * * *